United States Patent
Taguchi et al.

(10) Patent No.: US 6,871,010 B1
(45) Date of Patent: Mar. 22, 2005

(54) VIDEO RECORDER FOR RECORDING MOVING AND STILL PICTURE INFORMATION

(75) Inventors: Kenji Taguchi, Yokohama (JP); Nobuyuki Matsukawa, Yokosuka (JP); Hidehiro Katoh, Tokyo (JP); Hiroyuki Miyahara, Yokohama (JP); Michihiro Aso, Yokohama (JP); Takayuki Ohtsuka, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 965 days.

(21) Appl. No.: 09/640,002

(22) Filed: Aug. 17, 2000

(30) Foreign Application Priority Data

Sep. 3, 1999 (JP) .......................................... 11-249814

(51) Int. Cl.⁷ ........................... H04N 5/76; H04N 5/225
(52) U.S. Cl. ....................................... 386/120; 348/220
(58) Field of Search ............................ 386/38, 107, 96, 386/1, 120, 121; 348/220, 221.1, 231.7, 231.8, 239; H04N 5/76, 9/79, 5/225

(56) References Cited

U.S. PATENT DOCUMENTS

| 4,691,253 | A | * | 9/1987 | Silver .......................... 386/118 |
| 6,141,044 | A | * | 10/2000 | Anderson et al. ......... 348/231.6 |
| 6,169,575 | B1 | * | 1/2001 | Anderson et al. ......... 348/231.2 |
| 6,667,765 | B1 | * | 12/2003 | Tanaka ..................... 348/229.1 |

* cited by examiner

Primary Examiner—Thai Tran
(74) Attorney, Agent, or Firm—Connolly Bove Lodge & Hutz, LLP

(57) ABSTRACT

When a still picture information is recorded on the recording medium 7 while a moving picture information is recorded by the VTR 6, a still picture information to be recorded can be confirmed and recorded by displaying the still picture information to be recorded in a sub picture frame on the screen of the viewfinder 8, which displays the moving picture information currently recorded.

2 Claims, 6 Drawing Sheets

Still Picture

Moving Picture

Moving Picture    Still Picture

Still Picture     Moving Picture

Moving Picture     Still Picture

Still Picture     Moving Picture

VIDEO RECORDER FOR RECORDING MOVING AND STILL PICTURE INFORMATION

BACKGROUND OF THE INVENTION

1. Field of the Invention

The present invention relates to a recording apparatus of a video signal and a recording method of the video signal, particularly, relates to a recording apparatus of a video signal, which can record both moving picture information and still picture information, and a recording method of the video signal for recording both the moving picture information and the still picture information.

2. Description of the Related Art

There provided a video signal recording apparatus, which comprises a video camera equipped with an image sensing device such as a CCD (charge coupled device) and a recording and reproducing apparatus for recording a video signal on a recording medium such as a magnetic tape being organized in one body. Such the video signal recording apparatus is mainly utilized for recording a moving picture information. However, a recording apparatus, which can record both moving picture information and still picture information, has been introduced in accordance with a recent demand for recording a still picture information as well as a moving picture information.

Such the video signal recording apparatus of the prior art is constructed as shown in FIG. 10, for example. In FIG. 10, the recording apparatus comprises the CCD 1, the analog to digital converter (AD) 2 for converting an analog signal outputted from the CCD 1 into a digital signal, the signal processor 3 for converting a digital video signal outputted from the AD 2 into a luminance signal and a color difference signal and for outputting a digital video signal (moving picture information), the field memory 4 for storing the digital video signal outputted from the signal processor 3 field by field and for outputting a recorded digital video signal (still picture information) per one field, the switch 5 for supplying either the digital video signal (moving picture information) outputted from the signal processor 3 or the digital video signal (still picture information) outputted from the field memory 4 to the succeeding recording section. The recording section further comprises the video tape recorder (VTR) 6, which records a digital video signal outputted from the switch 5 on a magnetic tape, the recording medium 7 such as a memory card composed of a semiconductor memory and a hard disk drive (HDD) for recording a digital video signal outputted from the switch 5 and the view finder 8 for displaying a digital video signal outputted from the switch 5.

However, in a case of recording such a still picture information as shown in FIG. 4, the current video signal recording apparatus mentioned above records the still picture information on both the VTR 6 and the recording medium 7 or on either one after confirming the still picture information to be recorded by the view finder 8 with switching the switch 5 over to the field memory 4. The VTR 6 can not record a moving picture information while recording a still picture information. Accordingly, there existed a problem that a desire for recording some moving picture information such as shown in FIG. 5, for example, can not be realized while recording a still picture information.

SUMMARY OF THE INVENTION

Accordingly, in consideration of the above-mentioned problem of the prior art, an object of the present invention is to provide a recording apparatus of a video signal and a recording method of the video signal, which can simultaneously confirm a moving picture information and a still picture information by displaying both the still picture information and the moving picture information simultaneously on a viewfinder. Further, by selectively switching a digital video signal to be inputted to a video tape recorder (VTR), the recording apparatus and the recording method can select a still picture information to be recorded while recording a moving picture information and can record the still picture information on another recording medium other than one for recording the moving picture information.

In order to achieve the above object, the present invention provides, according to an aspect thereof, a recording apparatus of a video signal comprising: a first recording means for recording a digital video signal of a moving picture information on a first recording medium; a second recording means for recording a digital video signal of a still picture information on a second recording medium; switch means for designating a preparation of recording the still picture information; and a display means for displaying either one of the moving picture information and the still picture information or both of them after processing them for altering a picture size on one screen when the switch means is operated, the recording apparatus records the still picture information to be recorded on the second recording medium after the still picture information is confirmed.

According to another aspect of the present invention, there provided a recording system of a video signal, which comprises steps of: recording a digital video signal of a moving picture information on a first recording medium; recording a digital video signal of a still picture information on a second recording medium; displaying either one of the moving picture information and the still picture information or both of them after processing them for altering a picture size on one screen when a switch means for designating a preparation of recording the still picture information is operated; and recording the still picture information to be recorded on the second recording medium after the still picture information is confirmed.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
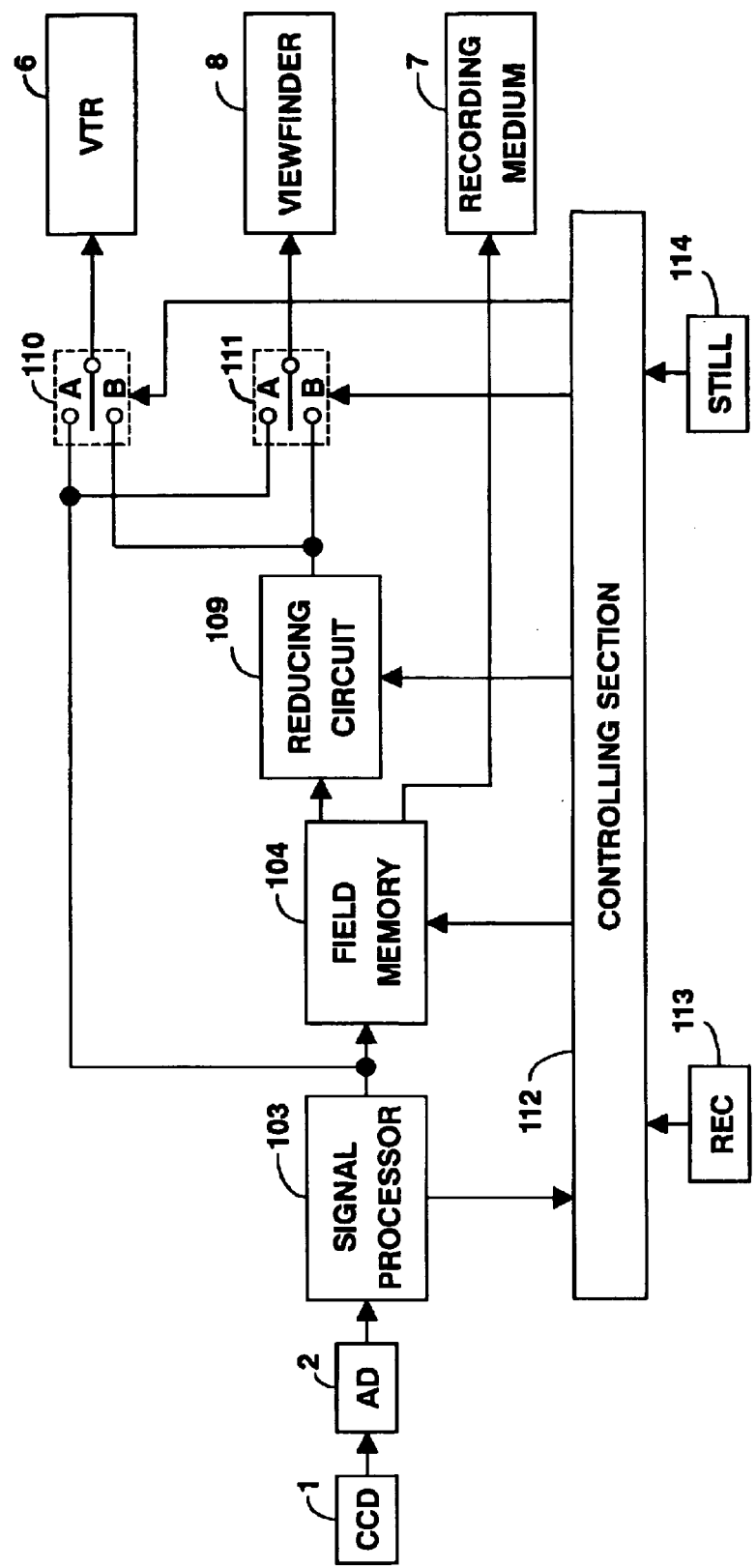
FIG. 1 is a block diagram of a recording apparatus of a video signal according to a first embodiment of the present invention.

FIG. 1 is a block diagram of a recording apparatus of a video signal according to a first embodiment of the present invention.

Figure 4:
FIG. 4 shows an exemplary indication of a still picture information.

FIG. 4 shows an exemplary indication of a still picture information.

Figure 5:
FIG. 5 shows an exemplary indication of a moving picture information.

FIG. 5 shows an exemplary indication of a moving picture information.

Figure 6:
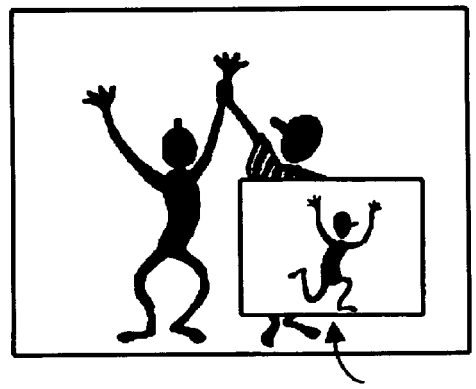
FIG. 6 shows an exemplary indication of superimposing a still picture information on a moving picture information.

FIG. 6 shows an exemplary indication of superimposing a still picture information on a moving picture information.

In FIG. 1, a recording apparatus of a video signal comprises a CCD (charge coupled device) 1, an analog to digital converter (AD) 2, a signal processor 103, a field memory 104, a reducing circuit 109, a first switch 110, a second switch 111, a controlling section 112, a recording (REC) switch 113, a still (STILL) switch 114, a video tape recorder (VTR) 6, a recording medium 7 and a view finder 8. The CCD 1 is an image sensing device. The AD 2 converts an analog signal outputted from the CCD 1 into a digital signal. The signal processor 103 converts a digital video signal outputted from the AD 2 into a luminance signal and a color difference signal and outputs a digital video signal (moving picture information). The field memory 104 stores the digital video signal outputted from the signal processor 103 field by field and outputs a recorded digital video signal (still picture information) per one field. The reducing circuit 109 is supplied with a digital video signal (still picture information) outputted from the field memory 104 and reduces a screen size of the digital video signal (still picture information) to a predetermined ratio in horizontal and vertical directions and outputs the reduced digital video signal (still picture information). The reducing circuit 109 can be realized by a reducing electronic zooming function such as, for example, a circuit of realizing a reducing function by obtaining imaginary pixel data through an operation about an interpolation process such as linear interpolation and spline interpolation, which are applied to a plurality of actual pixel data adjacent to vertical and horizontal directions, and another circuit of realizing a reducing function by reading out pixels of a digital video signal read out from the field memory 104 through decimating process such that one pixel is decimated from 3 pixels. The first switch 110 selectively switches a digital video signal (moving picture information) outputted from the signal processor 103 over to a digital video signal (still picture information) from the reducing circuit 109 or vice versa and outputs a selected digital signal to the VTR 6. The second switch 111 selectively switches a digital video signal (moving picture information) outputted from the signal processor 103 over to a digital video signal (still picture information) from the reducing circuit 109 or vice versa and outputs a selected digital signal to the view finder 8. The controlling section 112 controls operations of the recording apparatus of video signal totally. The REC switch 113 initiates to record a moving picture information. The STILL switch 114 initiates to record a still picture information. The recording medium 7 is a medium such as a memory card composed of a semiconductor memory and a hard disk drive (HDD) for recording a digital video signal outputted from the field memory 104.

A basic operation of the recording apparatus shown in FIG. 1 is depicted first. A control signal is emitted from the controlling section 112 by pressing the REC switch 113 for initiating recording of a moving picture and the first switch 110 is selectively switched over to a terminal "A". Accordingly, a digital video signal (moving picture information) outputted from the signal processor 103 is supplied to the VTR 6 and the VTR 6 records the moving picture information on a magnetic tape. At the same time, the control signal emitted from the controlling section 112 makes the second switch 111 selectively switch over to a terminal "A", so that the digital video signal (moving picture information), which is currently recorded by the VTR 6, is displayed on the view finder 8. A digital video signal (moving picture information) outputted from the signal processor 103 is written in the field memory 104 in units of one field, so that a digital video signal (moving picture information) is recorded in the field memory 104 in units of sequential field while recording a digital video signal (moving picture information) by the VTR 6.

In a case of recording a still picture information while recording a moving picture information, a control signal is emitted from the controlling section 112 when the STILL switch 114 is kept pressing down to a halfway of a switching stroke or pressing down slightly. The control signal stops writing in the field memory 104. Accordingly, the field memory 104 is recorded with a digital video signal (still picture information) at a time when the STILL switch 114 is pressed down to a halfway of the switching stroke.

Further, in a case that the STILL switch 114 is pressed down to a halfway, the controlling section 112 supplies another control signal to the field memory 104 and the reducing circuit 109, wherein the control signal is designated to reduce a digital video signal (still picture information) recorded in the field memory 104 to a predetermined size. Accordingly, the reducing circuit 106 outputs a reduced digital video signal (still picture information), which is reduced from the digital video signal (still picture information) recorded in the field memory 104, to the second switch 111.

The second switch 111 is selectively switched over from the terminal "A" to the terminal "B" in response to the control signal from the controlling section 112 at a timing when a still picture information is superimposed on a predetermined allocation in a whole picture frame of a moving picture information as shown in FIG. 6. Accordingly, the view finder 8 displays a picture as shown in FIG. 6 such that a digital video signal (moving picture information) outputted from the signal processor 103 as shown in FIG. 6 is superimposed with a digital video signal (still picture information) outputted from the reducing circuit 109 as shown in FIG. 4.

In a case of recording a still picture information displayed on the viewfinder 8 in the recording medium 7, a digital video signal (still picture information) is read out from the field memory 104 with a control signal generated in the controlling section 112 when the STILL switch 114 is fully pressed down. The digital video signal (still picture information) is transferred to the recording medium 7 without any reduction, and then it is written in a predetermined address of the recording medium 7.

Second Embodiment

Figure 2:
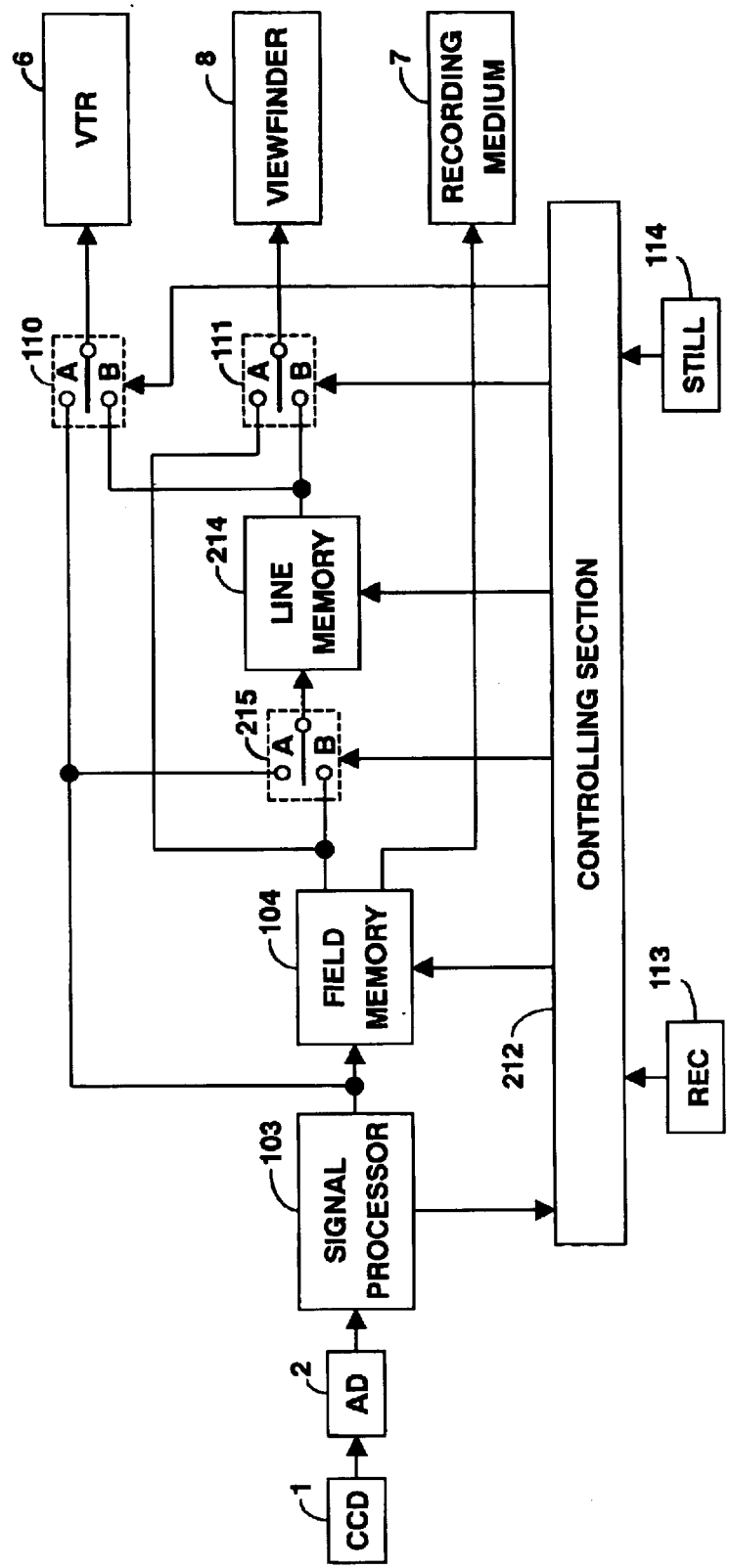
FIG. 2 is a block diagram of a recording apparatus of a video signal according to a second embodiment of the present invention.

FIG. 2 is a block diagram of a recording apparatus of a video signal according to a second embodiment of the present invention.

In FIG. 2, a recording apparatus comprises the CCD 1, the AD 2, the signal processor 103, the field memory 104, a third switch 215, a line memory 214, the first switch 110, the second switch 111, a controlling section 212, the REC switch 113, the STILL switch 114, the VTR 6, the recording medium 7 and the viewfinder 8. The recording apparatus depicted in the second embodiment is similar to that of the first embodiment shown in FIG. 1 and further comprises the third switch 215 and the line memory 216 in addition to the recording apparatus of the first embodiment shown in FIG. 1. The third switch 215 selectively switches a digital video signal (moving picture information) outputted from the signal processor 103 over to a digital video signal (still picture information) from the field memory 104 or vice versa and outputs a selected digital signal to the VTR 6. The line memory 214 is inputted with a digital video signal supplied from the third switch 215 and outputs the digital video signal with being delayed for a degree of one half line.

In a case that the third switch 215 is selectively switched over to a terminal "A" by a control signal from the controller section 212, a digital video signal (still picture information) read out from the field memory 104 by a speed of two times faster than that of writing in the field memory 104 is supplied to a terminal "A" of the second switch 111 and a digital video signal, (moving picture information) outputted from the signal processor 103 is supplied to a terminal "B" of the second switch 111 through the third switch 215 and the line memory 214 with being delayed for a degree of one half line. During a first half period from a beginning of a line to one half of the line, the controlling section 2 12 outputs a control signal for selecting the terminal "A" of the second switch 111. During a second half period from one half to an end of the line, the controlling section 212 outputs a control signal for selecting the terminal "B" of the second switch 111. Accordingly, the viewfinder 8 displays a picture shown in FIG. 7 such that a digital video signal (still picture information) recorded in the field memory 104 is displayed on a left half area of a screen and a digital video signal (moving picture information) outputted from the signal processor 103 is displayed on a right half area of the screen.

Figure 8:
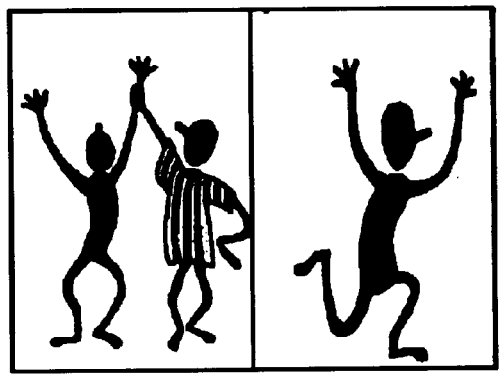
FIG. 8 shows another exemplary indication of a still picture information and a moving picture information in parallel.

Further, in a case that the third switch 215 is selectively switched over to a terminal "A" by a control signal from the controlling section 212, the viewfinder 8 displays a picture shown in FIG. 8 such that a digital video signal (moving picture information), which is clipped from a center area of a digital video signal (moving picture information) outputted from the signal processor 103, is displayed on a left half area of a screen and a digital video signal (still picture information), which is clipped from a center area of a digital video signal (still picture information) outputted from the field memory 104, is displayed on a right half area of the screen.

Third Embodiment

Figure 3:
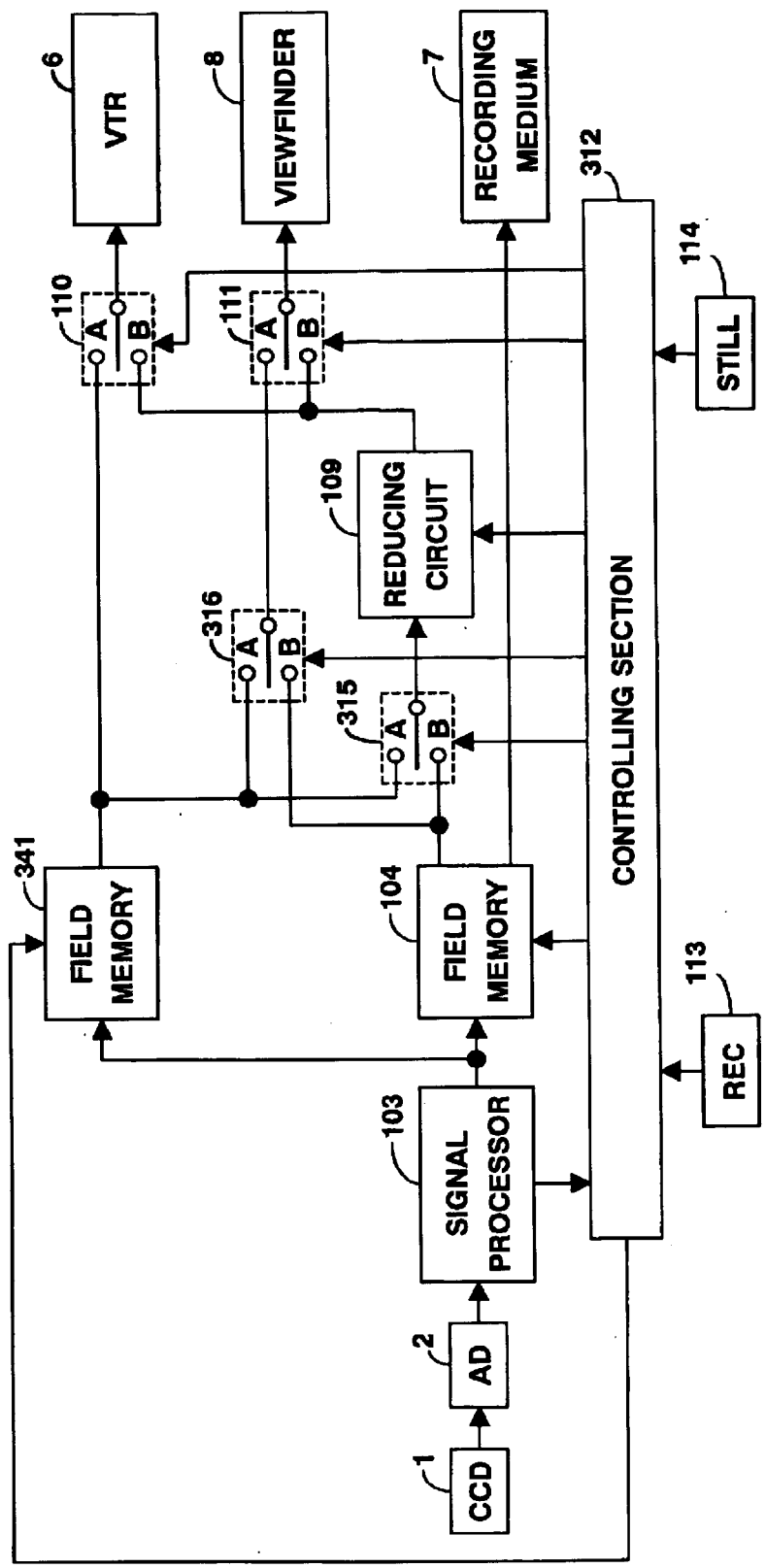
FIG. 3 is a block diagram of a recording apparatus of a video signal according to a third embodiment of the present invention.

FIG. 3 is a block diagram of a recording apparatus of a video signal according to a third embodiment of the present invention.

Figure 9:
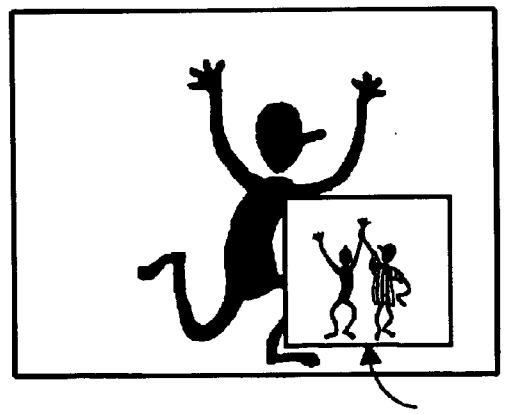
FIG. 9 shows an exemplary indication of superimposing a moving picture information on a still picture information.
Figure 10:
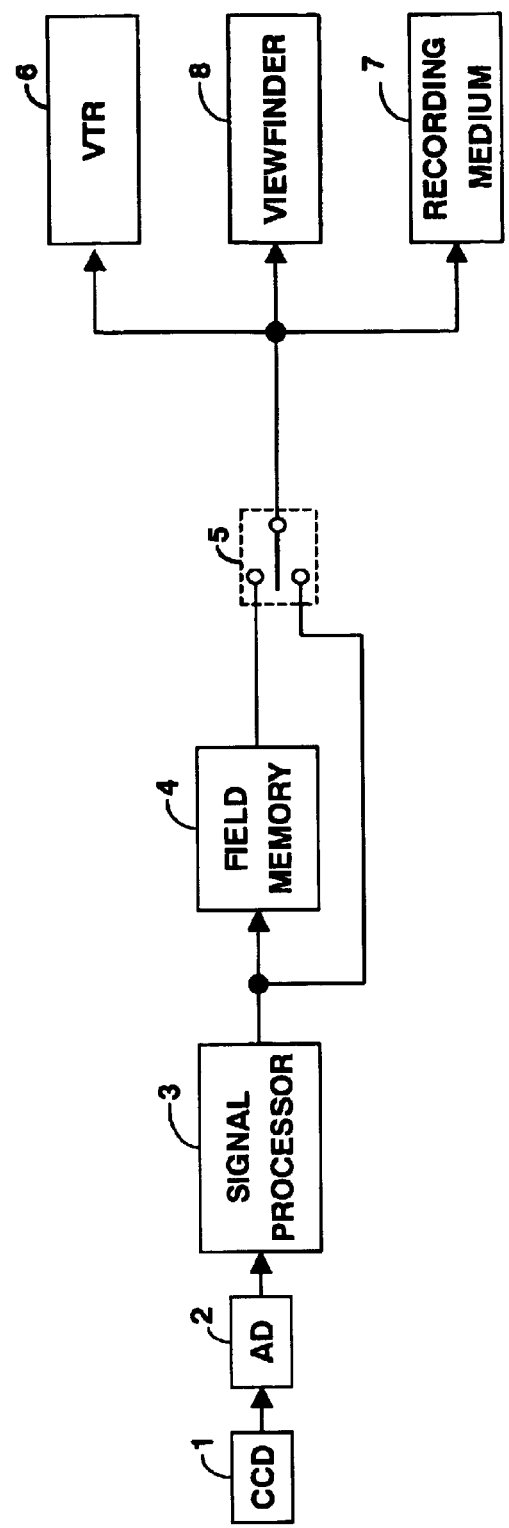
FIG. 10 is a block diagram of a recording apparatus of a video signal according to the prior art.

FIG. 9 shows an exemplary indication of superimposing a moving picture information on a still picture information.

In FIG. 3, a recording apparatus comprises the CCD 1, the AD 2, the signal processor 103, a first field memory 104, a second field memory 341, a third switch 315, a fourth switch 316, the reducing circuit 109, the first switch 110, the second switch 111, a controlling section 312, the REC switch 113, the STILL switch 114, the VTR 6, the recording medium 7 and the viewfinder 8. The recording apparatus depicted in the third embodiment is similar to that of the first embodiment shown in FIG. 1 and further constituted such that the second field memory 341 is provided between the signal processor 103 and the terminal "A" of the first switch 110, the fourth switch 316 is inserted after the second field memory 341, and the third switch 315 is provided prior to the reducing circuit 109 so as to selectively switch an output signal of the first field memory 104 over to an output signal of the second field memory 341 or vice versa. The second field memory 341 is recorded with a digital video signal (moving picture information) outputted from the signal processor 103. The first field memory 104 records a still picture information, which is taken at a time when the STILL switch 114 is pressed down to a halfway of a switching stroke.

In a case of displaying a still picture information as a sub picture frame as shown in FIG. 9, the fourth switch 316 is switched over to a terminal "A" so as to select a digital video signal (moving picture information) outputted from the second field memory 341 and the third switch 315 is switched over to a terminal "B" so as to select a digital video signal (still picture information) outputted from the first field memory 104 respectively by a control signal from the controlling section 312.

While the third and fourth switches 315 and 316 are switched over to the terminal "B" and "A" respectively as mentioned above, if the STILL switch 114 is pressed down to a halfway of switching stroke writing into the first field memory 104 is interrupted by a control signal from the controlling section 312 and a still picture information, which is taken at a time when the STILL switch 114 is pressed down to a halfway of switching stroke, is maintained in the first field memory 104. The second field memory 341 is written with a digital video signal (moving picture information) supplied from the signal processor 103 field by field and sequentially read out, so that a digital video signal outputted from the second field memory 341 becomes a moving picture information.

A digital video signal (still picture information) read out from the first field memory 104 is inputted to the reducing circuit 109 through the third switch 315 and outputted to the terminal "B" of the second switch 111 as a reduced picture in a predetermined size. On the other hand, a digital video signal (moving picture information) read out from the second field memory 341 is outputted to the terminal "A" of the second switch 111 through the fourth switch 316. The controlling section 312 generates a control signal for selectively switching the terminal "A" of the second switch 111 over to the terminal "B" at a timing when a still picture information is superimposed on a moving picture information. Accordingly, a moving picture information is displayed as a main picture frame and a still picture information is displayed in a sub picture frame as shown in FIG. 6.

In a case of displaying a moving picture information in a sub picture frame as shown in FIG. 9, the controlling section 312 generates a control signal to shift the fourth switch 316 to the terminal "B" so as to select a digital video signal (still picture information) outputted from the first field memory 104 and the third switch 315 to the terminal "A" so as to select a digital video signal (moving picture information).

While the third and fourth switches 315 and 316 are switched over to the terminal "A" and "B" respectively as mentioned above, if the STILL switch 114 is pressed down to a halfway of switching stroke writing into the first field memory 104 is interrupted by a control signal from the controlling section 312 and a still picture information, which is taken at a time when the STILL switch 114 is pressed down to a halfway of switching stroke, is maintained in the first field memory 104. The second field memory 341 is written with a digital video signal (moving picture information) supplied from the signal processor 103 field by field and sequentially read out, so that a digital video signal outputted from the second field memory 341 becomes a moving picture information.

A digital video signal (moving picture information) read out from the second field memory 341 is inputted to the reducing circuit 109 through the third switch 315 and outputted to the terminal "B" of the second switch 111 as a reduced picture in a predetermined size. On the other hand, a digital video signal (still picture information) read out from the first field memory 104 is outputted to the terminal "A" of the second switch 111 through the fourth switch 316. The controlling section 312 generates a control signal for selectively switching the terminal "A" of the second switch 111 over to the terminal "B" at a timing when a moving picture information is superimposed on a still picture information.

Accordingly, a still picture information is displayed as a main picture frame and a moving picture information is displayed in a sub picture frame as shown in FIG. 9.

Figure 7:
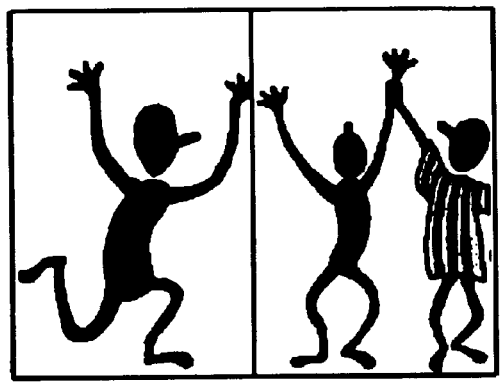
FIG. 7 shows an exemplary indication of a still picture information and a moving picture information in parallel.

While the invention has been described above with reference to specific embodiment thereof, it is apparent that many changes, modifications and variations in the arrangement of equipment and devices and in materials can be made without departing from the invention concept disclosed herein. For example, the picture shown in FIG. 7 is the one example for displaying 2 pictures in parallel on one screen such that these 2 pictures are clipped from only the center area of respective digital video signals. However, it is possible to display a composite picture such that one picture to be displayed on the left side of the screen is clipped from a center area of the digital video signal (still picture information) currently displayed on the left, on the other hand, another picture to be displayed on the right side of the screen is a whole picture information by compressing a digital video signal (moving picture information) outputted from the signal processor 103 in a horizontal direction. Further, the digital video signal (moving picture information) on the right side of the screen can be displayed as it is. However, in this case, right half of the moving picture information can not be displayed. With respect to the still picture information displayed on the left side of the screen, it can be displayed with compressing in a horizontal direction or can be outputted as it is.

In addition thereto, the picture shown in FIG. 8, it is also possible to display the whole still picture information or moving picture information with compressing in the horizontal direction as mentioned above. It can also be displayed such that both still and moving picture information are compressed in the horizontal direction. Furthermore, by outputting either moving picture information or still picture information or both of them, it is possible to display a picture based on the format shown in FIG. 8.

As mentioned above, according to the present invention, while a moving picture information is recorded, a still picture information can be recorded with continuously recording and confirming the moving picture information. Accordingly, it can be eliminated that unnecessary still picture information is recorded and necessary moving picture information is failed to be confirmed or recorded while recording a still picture. Further, it is advantageous for an operator of a recording apparatus of the present invention to record both still picture and moving picture information simultaneously with a sense of congruity.

What is claimed is:

1. A recording apparatus of a video signal comprising:

a first recording means for recording a digital video signal of moving picture information on a first recording medium;

a second recording means for recording a digital video signal of still picture information on a second recording medium;

switch means to be selectively pressed either halfway or all the way down;

a display means for displaying either said moving picture information or said still picture information;

a processing means for controlling the processing means to change the size of a picture of either one of the moving picture information and the still picture information or both of them to be displayed on the display means, and controlling the display of both the moving picture information and still picture information outputted from the processing means on the display means simultaneously when the switch is pressed halfway down; and wherein the control means controls the second recording means to record a digital video signal of a still picture information on the second recording medium when the switch is pressed all the way down.

2. A recording method of a video signal comprising steps of:

recording a digital video signal of a moving picture information on a first recording medium;

displaying the moving picture information on a display means;

producing a still picture information to be recorded on a second recording medium extracted from the moving picture information;

displaying at least either one of a moving picture information and a still picture information on the display means by changing the size of at least either one of the moving picture information and the still picture information when a switch is selectively pressed down halfway or all the way down; and recording a digital video signal of a still picture information on the second recording medium when the switch is pressed all the way down.

* * * * *

UNITED STATES PATENT AND TRADEMARK OFFICE
CERTIFICATE OF CORRECTION

PATENT NO. : 6,871,010 B1
DATED : March 22, 2005
INVENTOR(S) : Kenji Taguchi et al.

It is certified that error appears in the above-identified patent and that said Letters Patent is hereby corrected as shown below:

<u>Title page,</u>
Item [75], Inventor, add -- Kenji Matsuoka, Yokohama (JP) --

Signed and Sealed this

Fourteenth Day of June, 2005

JON W. DUDAS
*Director of the United States Patent and Trademark Office*